(12) United States Patent
Petit et al.

(10) Patent No.: US 11,045,931 B2
(45) Date of Patent: Jun. 29, 2021

(54) TOOL AND METHOD FOR INSTALLING A SEAL BY ALLOWING A PRECOMPRESSION TO JOIN TWO TUBULAR PARTS

(71) Applicants: Airbus Operations Ltd., Bristol (GB); Airbus Operations (S.A.S.), Toulouse (FR)

(72) Inventors: David Petit, Portishead (GB); Geneviève Schubetzer, Colomiers (FR); Damien Fraysse, Mondonville (FR); Serge Vernet, Pompignan (FR); Sophie Gourdon, Blagnac (FR); Nicolas Charmes, Castelsarrasin (FR); Mathieu Trindade, Lauzerville (FR); Joel Antic, Lasserre (FR)

(73) Assignees: Airbus Operations LTD., Bristol (GB); Airbus Operations (S.A.S.), Toulouse (FR)

( * ) Notice: Subject to any disclaimer, the term of this patent is extended or adjusted under 35 U.S.C. 154(b) by 213 days.

(21) Appl. No.: 16/224,338

(22) Filed: Dec. 18, 2018

(65) Prior Publication Data
US 2019/0184532 A1 Jun. 20, 2019

(30) Foreign Application Priority Data
Dec. 19, 2017 (FR) ...................... 1762474

(51) Int. Cl.
*B25B 27/00* (2006.01)
*F16L 19/04* (2006.01)
(Continued)

(52) U.S. Cl.
CPC .......... *B25B 27/0028* (2013.01); *B25B 5/147* (2013.01); *B25B 27/10* (2013.01);
(Continued)

(58) Field of Classification Search
CPC ..... B25B 27/0028; B25B 27/10; B25B 5/147; F16L 19/07; F16L 19/046; F16L 21/035;
(Continued)

(56) References Cited

U.S. PATENT DOCUMENTS 8,322,755 B2 12/2012 Kluss
9,347,597 B2 * 5/2016 Adeyemi .................. F16L 1/10

FOREIGN PATENT DOCUMENTS

EP 2336625 A2 6/2011
EP 2596913 A2 5/2013
(Continued)

*Primary Examiner* — Monica S Carter
*Assistant Examiner* — Alberto Saenz
(74) *Attorney, Agent, or Firm* — Jenkins. Wilson, Taylor & Hunt, P A (57) ABSTRACT

When coupling tubular parts by fitting, the seal interposed between them may roll on itself, be pinched or damaged. Now, a twisted or damaged seal no longer correctly ensures the seal-tightness and it is very difficult to detect this. The present application discloses a tool for installing a seal between two tubular parts, one male and one female, including a compression ring to encircle the male part and exert a compression on the seal before producing the join. The tool also includes a tongue that can be positioned at a chamfered surface of the female tubular part. The tongue makes it possible to offer the pre-compressed seal with the dimensions of the female part a continuous travel making it possible to prevent any twisting or other effect compromising the seal-tightness.

12 Claims, 5 Drawing Sheets

(51) Int. Cl.
*F16L 19/07* (2006.01)
*B25B 27/10* (2006.01)
*B25B 5/14* (2006.01)
*F16L 21/035* (2006.01)

(52) U.S. Cl.
CPC .............. *F16L 19/046* (2013.01); *F16L 19/07* (2013.01); *F16L 21/035* (2013.01)

(58) Field of Classification Search
CPC ......... Y10T 29/53657; Y10T 29/53678; Y10T 29/53796; Y10T 29/53917
USPC .......................................................... 29/237
See application file for complete search history.

(56) References Cited

FOREIGN PATENT DOCUMENTS

| | | | |
|---|---|---|---|
| EP | 3501737 | B1 | 4/2020 |
| FR | 3048052 | A1 | 8/2017 |
| GB | 2177470 | * | 1/1987 |

* cited by examiner

TOOL AND METHOD FOR INSTALLING A SEAL BY ALLOWING A PRECOMPRESSION TO JOIN TWO TUBULAR PARTS

CROSS-REFERENCE TO RELATED APPLICATION

This application claims the benefit of and priority to French patent application number 17 62474 filed on Dec. 19, 2017, the entire disclosure of which is incorporated by reference herein.

TECHNICAL FIELD

The disclosure herein relates to a tool for installing a seal intended to ensure the seal-tightness between tubular parts and the installation method using this tool. More particularly, the disclosure herein applies to annular seals that can be interposed between different types of tubular parts intended to be coupled such as, for example, a pipe with a coupling, a female end-fitting with a male end-fitting. It is particularly applicable in the field of aircraft construction and in the maintenance thereof.

BACKGROUND

According to a particular application, seals are widely used on board aircraft. They ensure in particular the seal-tightness between the parts forming the fluid transport pipelines.

When a seal is installed blind while coupling piping, the displacement of one part relative to another may lead to an undesirable effect on the seal provided between the latter compromising the seal-tightness, such as, for example twisting, pinching, damage, deformation, an alteration of one or more physical characteristics. Particular features specific to the joined parts can increase the risks of this effect or of these effects on the seal. Thus, for example, the end of some pipeline-forming parts is chamfered internally. The greater the slope of the chamfer, the greater the risks are of the effect or effects compromising the seal-tightness. According to another example, a seal can be positioned in a groove of a pipe designed to receive it by stretching. Now, it may be that the seal rolls on itself and undergoes effects other than those given by way of example above when parts to be coupled are joined: in fact, as an illustrative example, a part of the seal protruding beyond the groove forms a catch that is likely, with the frictions of the surface with which the seal has to enter into contact to ensure the seal-tightness, to displace the seal.

When a seal undergoes one or more effects of the type of those stated above, it no longer correctly ensures the seal-tightness.

There is currently no tool that makes it possible to ensure the mechanical hold and avoid an effect compromising the seal-tightness on a seal upon the installation thereof. Furthermore, such an alteration on the seal is difficult to detect. Indeed, since the mounting is performed blind, this alteration is not necessarily visible and all the more so when these zones in which the seal is mounted are of limited visibility. Thus, the alteration of a seal is very often detected with the appearance of a leak. Because of this, the detection occurs only after the system provided with the seal has been placed in service.

SUMMARY

An aim of the disclosure herein is therefore to provide a novel tool that makes it possible to avoid effects on the seal compromising the seal-tightness, such as, for example, the twisting or damaging thereof on any tubular part and in particular one with a chamfered end and provided with a groove in which the seal is installed.

For this, the subject matter herein discloses a tool for installing an annular seal intended to ensure the seal-tightness between two tubular parts, one male and one female, the male part being provided with a groove into which the seal is inserted and the end of the female part being chamfered, wherein the tool comprises a clamping band having a cylindrical inner face of planar surface forming a so-called compression ring intended to encircle the male part at least at the groove and to exert a compression on the seal, one of the two ends of the band being called female end because it is intended to come into contact with the female part and the other end being called male end, the female end of the band having a tongue protruding outwards of which one of the faces forms part of the cylindrical inner face of the band, the tongue having a form allowing it to come into contact with the chamfered surface of the female part.

The tongue makes it possible to offer the pre-compressed seal with the dimensions of the female part a continuous travel making it possible to prevent any twisting or other effect compromising the seal-tightness.

The installation tool has at least one of the following optional features, taken alone or in combination.

The tongue has a form such that the end of the tongue is flush with the inner surface of the female part beyond the chamfered surface when the tool is installed on the female part and the tongue is in contact with the chamfered surface of the female part.

The inner diameter of the end of the tongue is identical to the inner diameter of the female part.

The tongue has a right-angled prism form of which the planar lateral face opposite the right angle is intended to come into contact with the chamfered surface.

The band has a tapered inner face the radius of which decreases from the male end to the cylindrical face.

It comprises a base independent of the band having a form making it possible to hold the band in a position allowing the coupling with the male part and a base planar surface allowing it to rest on a surface such that the axis X-X of the ring is at right angles to the plane of the surface.

The base has a cavity of the form complementing an appendage provided on the female end of the band so as to hold the band in position on the base.

At least two guiding tabs are provided distributed at regular intervals at the periphery of the band.

At least the cylindrical and tapered faces of the band are made of transparent material.

The clamping band comprises at least two mutually-articulated portions linked by a closing/opening mechanism.

The disclosure herein relates also to a method for installing an annular seal intended to ensure the seal-tightness between two tubular parts, one male and one female, the male part being provided with a groove into which the seal is inserted and the end of the female part being chamfered, the method comprising:

compression of the seal installed on the male part using a tool comprising a clamping band having a cylindrical inner face of planar surface forming a so-called compression ring intended to encircle the male part at least at the groove and to exert a compression on the seal, one of the two ends of the band being called female end because it is intended to come into contact with the female part and the other being called male end;

insertion of the male part into the female part using the band, the female end of which has a tongue protruding outwards of which one of the faces forms part of the cylindrical inner face of the band, the tongue being placed in contact with the chamfered surface of the female part.

According to an optional feature, the installation method comprises a preliminary preparation step in which the band is positioned closed on a base before the step of compression of the seal obtained by the introduction of the male part into the band.

BRIEF DESCRIPTION OF THE DRAWINGS

Other aims, advantages and features of the disclosure herein will become apparent on reading the following description of the disclosure herein, given by way of non-limiting example with reference to the attached drawings in which.

DETAILED DESCRIPTION

Figure 1:
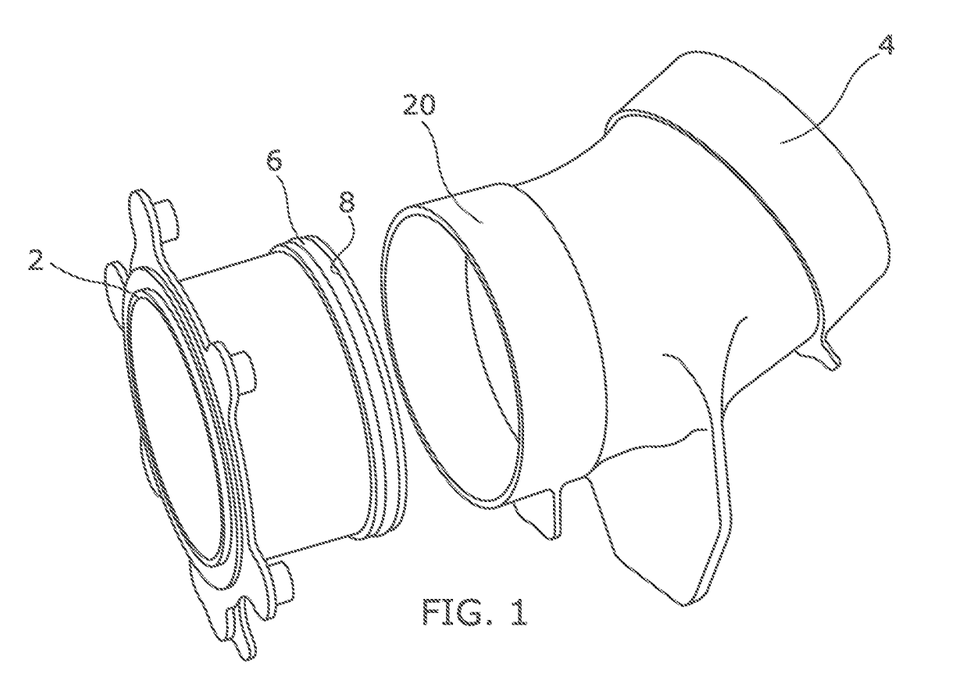
FIG. 1 is a perspective view of two tubular parts intended to be fitted into one another.
Figure 2:
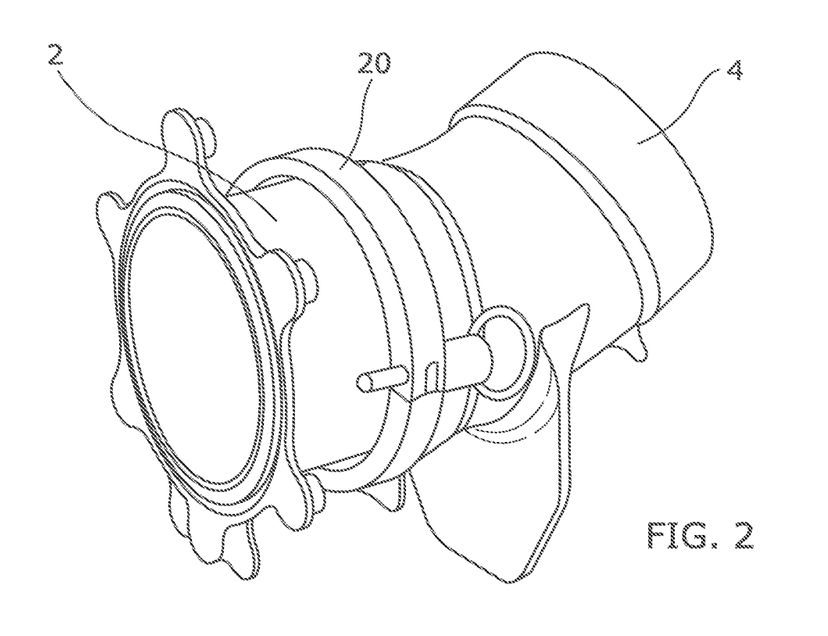
FIG. 2 is a perspective view of the tubular parts represented in FIG. 1 fitted into one another using a band of a tool according to the disclosure herein.

As shown in FIGS. 1 and 2, the disclosure herein relates to the coupling of a male tubular part 2 in a female tubular part 4 of any type and, more specifically, to the installation of an annular seal 6 between the coupled tubular parts. The term "tubular part" is taken in a very generic sense since it covers equally a duct, tube, end-fitting, connector etc, namely any tubular element intended to be coupled with another tubular element by hooping, fitting or equivalent. The tubular part is intended for any type of application, any type of fluid such as water, oil, air, oxygen or the like. The term "annular" covers a generic definition, namely any form enclosed on itself such as that of a torus for example. The seal can have any type of section; it can be, for example, a seal of O, D, quadrilobe section or the like. It can be lubricated or non-lubricated.

In the embodiments illustrated in FIGS. 1 through 19, the example is taken of the installation of an O annular seal, namely annular of circular section between a male end-fitting 2 and a female tube 4. As shown in FIG. 1, the annular seal 6 is pre-installed in an outer groove 8 of the male end-fitting 2. The seal 6 is inserted and held in place between the two flanks 10, 12 of the groove 8 visible in FIG. 3. The free end of the female tube 4 intended to surround the free end of the male end-fitting has a chamfered surface 14 (see FIG. 4); the greater the angle α between the outer surface 16 of the tube 2 and the chamfered surface 14, the greater the risks of effects compromising the seal-tightness, such as, for example, twisting, damage, pinching, deformation and/or the alteration of one or more physical properties of the seal. In the embodiment illustrated, the angle α varies between 20 and 30 degrees.

As shown in FIGS. 2 through 6, the installation tool 18 comprises an annular clamping band 20 intended to encircle the male tubular part 2, namely here the male end-fitting 2, to exert a compression force on the seal 6 installed in the groove 8. The tool 18 thus makes it possible to produce the coupling between the male 2 and female 4 tubular parts with a pre-compressed seal 6 as represented more specifically in FIGS. 4 and 5. The term pre-compressed is used to mean that the seal is compressed before being compressed by the fitting together of the tubular parts upon the coupling thereof. The compression sets the seal 6 to the final dimensions that it will assume once installed in the female part 4 (represented in FIG. 6) which makes it possible to eliminate any protrusion or relief upon the insertion of one part into the other forming a catch likely to provoke an effect of the type, for example, of twisting, deformation or damaging of the seal. The final dimension of the compressed seal corresponds to the inner diameter of the female part 4 at the point where the seal is in contact with the female part beyond the chamfered surface.

Figure 7:
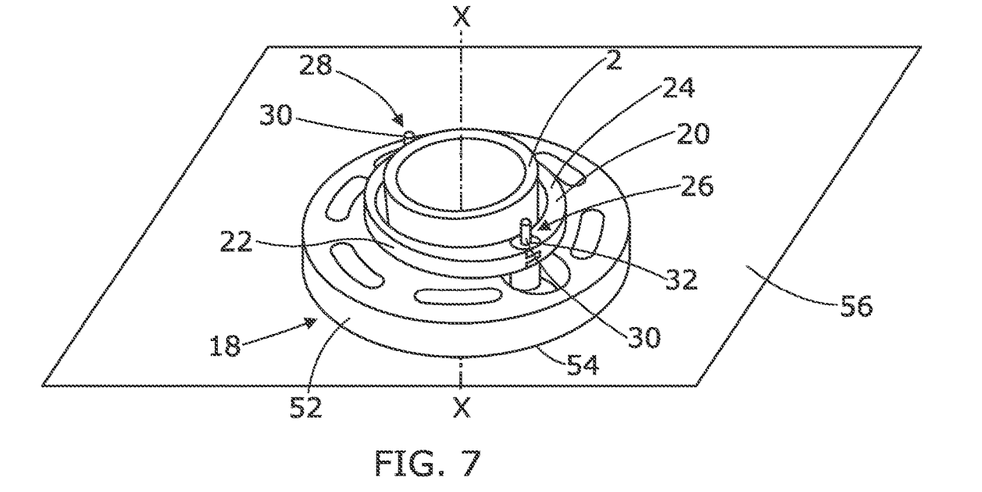
FIG. 7 is a perspective view of a base resting on a surface in which the band is held.

As clearly visible in FIG. 7 showing one possible embodiment of the tool, the band 20 comprises at least two portions 22, 24 that are mutually articulated, two by two, two of them being linked by a closing/opening mechanism 26. The band 20 surrounds the male tubular part 2, namely, in the example illustrated, the male end-fitting 2. The opening/closing of the band 20 via the closing mechanism 26 makes it possible to mount/dismantle the band 20 around the tubular part without having to dismantle it and guarantees that the desired diameter is maintained.

Figure 14:
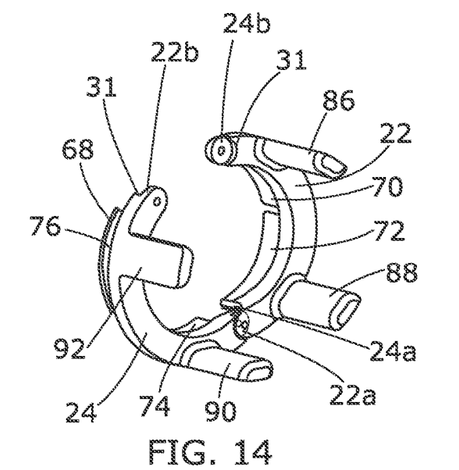
FIG. 14 is a perspective view of an embodiment of the band that is different from that represented in the preceding figures used for a joint without intermediate step.

In the embodiment illustrated in FIG. 7, the band 20 comprises two portions 22, 24 extending in a half-circle. One of the ends 22a, 24a of the portions 22, 24 are linked to one another articulated by a pivoting link 28: the pivoting link 28 is produced using a shaft 30 inserted into an orifice provided correspondingly in the abovementioned ends of the portions 22, 24 allowing the portions 22, 24 to pivot relative to one another about the shaft 30: in this case, the shaft 30 is, here, a pin. The other free end 22b, 24b of the portions 22, 24 is linked by the closing/opening mechanism 26 of any type and for example of quick release type such as a spring clip or toggle catch or simpler, pin mechanism 30 as in the embodiment illustrated. The mechanism 26 can be twinned with a second, complementary closing/opening mechanism to avoid the wear of the first mechanism creating a play which would alter the diameter of the band 20. As represented in FIG. 14, the free ends 22b, 24b of the portions 22, 24 are provided with a mechanical abutment 31 so as to block the movement of one end of portion towards the other upon closure. The abutment 31 makes it possible to block the portions 22, 24 in position of closure. In the embodiment illustrated in FIG. 14, the free ends 22b, 24b of the portions 22, 24 have a complementary reduced thickness so as to be superposed. The abutment 31 is formed by the transition between the reduced thickness of the free end 22b, 24b and the thickness of the portions 22 and 24 outside of the ends. The free ends 22b, 24b of the portions 22, 24 having a disc form, the abutment 31 has a partially circular form.

In the embodiment illustrated, the band 20 is produced with the dimensions of the male end-fitting to which it is applied. It is therefore not necessary to set the dimension of the diameter of the band 20 and, because of this, the pivoting link 28 and the closing/opening mechanism 26 are produced in the same way by a pin attachment system 30: a pin 30 is inserted into corresponding orifices 32 produced in the portions 22, 24. The pulling force exerted by the closing of the band 20 is converted into compression force on the seal 6 placed on the male tubular part 2.

Figure 3:
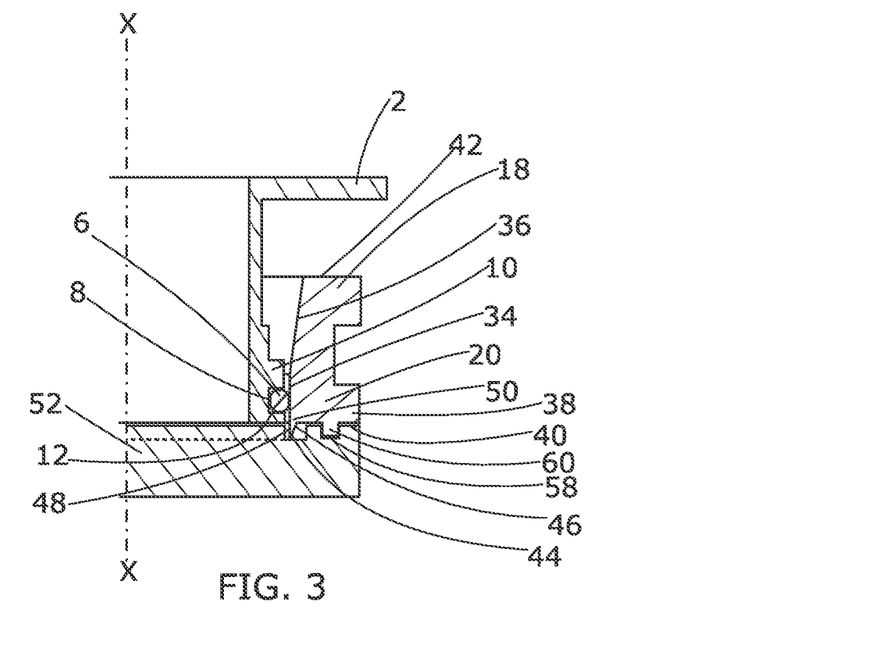
FIG. 3 is a schematic partial cross-sectional view of the fitting zone when the male tubular part represented in FIG. 2 is inserted into the band of the tool using a base also forming part of the tool for installing the seal in the case of a join involving an intermediate installation step of the type of preliminary preparation of the male tubular part in the band.
Figure 10:
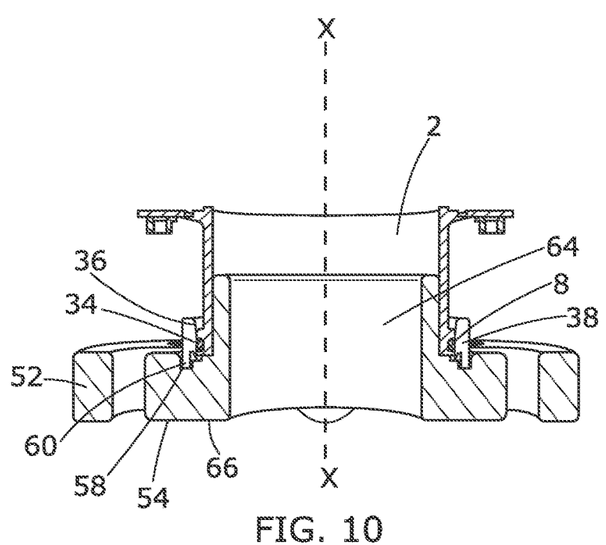
FIG. 10 is a longitudinal cross-sectional view of the assembly represented in FIG. 9.
Figure 11:
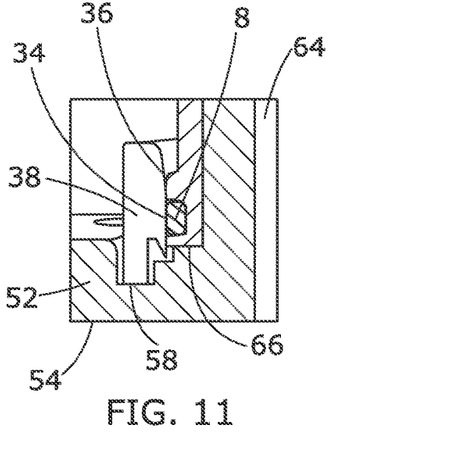
FIG. 11 is an enlarged view of the zone relating to the band and its near environment represented in FIG. 10.

As illustrated in FIGS. 3, 10 and 11, the inner part of the annular clamping band 20 intended to be placed facing and in contact with the male tubular part 2 comprises a cylindrical wall or face 34 of circular cylindrical section with planar surface and an adjacent tapered wall or face 36 in the longitudinal direction of the band associated with the part 2. The band 20 at the cylindrical part 34 forms a so-called compression ring 38 about an axis X-X of revolution, an axis that is situated in the longitudinal direction of the band 20 and of the part 2. The axis X-X is also axis of revolution for the tapered part 36. A plane at right angles to the axis X-X is hereinafter called radial plane. The compression ring 38 is intended to encircle the male tubular part 2 at least at the groove 8 and to exert a compression on the seal 6 placed in the groove 8. As will be seen later, the join can be produced in a single step in which the ring 38 is directly applied onto the male tubular part 2 or with an intermediate step in which the part 2 is introduced into the band 20.

As represented in FIGS. 3 through 6, the two ends 40, 42 of the band 20 in the direction of the axis X-X, represented by two planar surfaces 40, 42 each situated in a radial plane, are, for one of them, called female end 40 because it is intended to come into contact with the female tubular part and, for the other, called male end 42. The female end 40 of the band 20 has a tongue 44, protruding outwards relative to the radial plane of the female end 40.

When the male tubular part is coupled in the female tubular part, the tongue 44 of the tool 18 which grips the male tubular part comes into contact against the chamfered surface 14 of the female tubular part and, given its complementary form, makes it possible to guide the compressed seal 6 towards the non-chamfered inner surface of the female tubular part while retaining its dimensions throughout the installation and thus avoiding any accident. The tool thus reduces the edge formed by the change of surface between the non-chamfered surface of the male tubular part 2 and the chamfered surface 14 of the female tubular part 4 and allows the insertion of the seal without effect on the seal such as damage, a change of form or twisting.

Figures 4, 5:
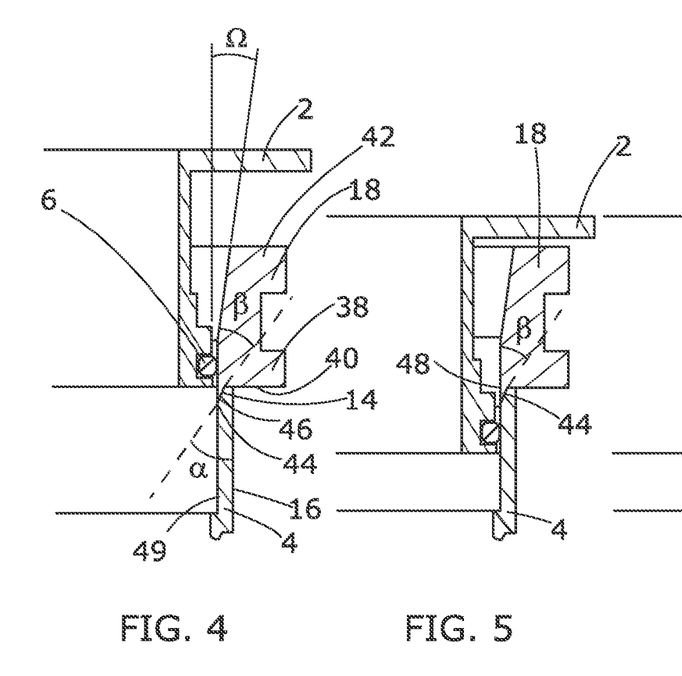
FIG. 4 is a schematic partial longitudinal cross-sectional view of the fitting zone when the male part associated with the band is introduced into the female part.
FIG. 5 is a schematic partial longitudinal cross-sectional view of the fitting zone when the male part associated with the band has penetrated into the female part.
Figure 6:
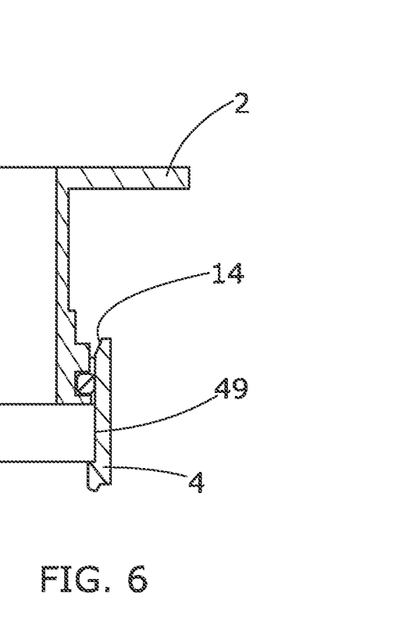
FIG. 6 represents a schematic partial longitudinal cross-sectional view of the fitting zone when the tubular parts are fitted to one another and the band has been separated therefrom.

As shown in FIGS. 3 through 5, the tongue 44 has a right-angled prism form that is curved and closed on itself, of which the planar lateral face 46 opposite the right angle is intended to come into contact with the chamfered surface 14. One of the faces 48 of the prism forming the right angle forms part of the cylindrical face 34 of the compression ring 38: the face 48 of the prism will be called inner face. Because of this right-angled prism complementing the form of the chamfered end of the female tube, when the tongue 44 is applied against the surface 14, the inner face 48 is parallel to the outer surface 16 of the tube 2. The other face 50 of the prism forming the right angle is integral with the band at its end 40 situated in a radial plane.

Preferably, the dimensions of the tongue and in particular the angle β formed between the inner face 48 and the lateral face 46 are matched to the dimensions of the chamfered surface 14 of the female tubular part so that the maximum of the surface of the lateral face 46 of the tongue 44 is in contact with the chamfered surface 14: the aim is for the inner face 46 of the tongue to be flush with the inner surface 49 of the female tubular part situated beyond the chamfered surface 14 so as to form only a single surface when the seal is inserted into the female tubular part. Thus, in the disclosure herein, according to an illustrative embodiment, the angle β is identical the angle α and lies between 20 and 30 degrees.

As seen previously, the inner part of the band 20 has a tapered face 36 whose radius decreases from the male end 42 to the cylindrical face 34. The tapered face 36 makes it possible to compress the seal 6 gradually. In the case where the band 20 is not directly applied onto the male tubular part 2 but the male tubular part 2 is inserted into the band 20 the constriction of the tapered inner face 36 of the band deforms the seal 6 by progressive compression until it arrives at the cylindrical face 34. The cylindrical face 34 has dimensions such that the compression of the seal is identical to that exerted by the inner surface of the female tubular part. For this, the inner radius of the band 20 decreases to a value corresponding to the inner radius at the face 34 which should be identical to the inner diameter of the female part at the point where the seal is in contact with the female part beyond the chamfered surface.

Moreover, the tapered face 36 forms an angle Ω with the face 34. This angle should offer a slope allowing the progressive compression of the seal. According to an illustrative embodiment, this angle varies between 5 and 20 degrees.

Figure 8:
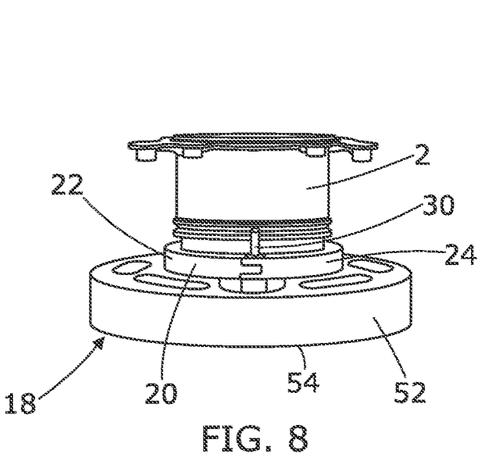
FIG. 8 represents a perspective view in which the male tubular part is introduced into the band held by the base.
Figure 9:
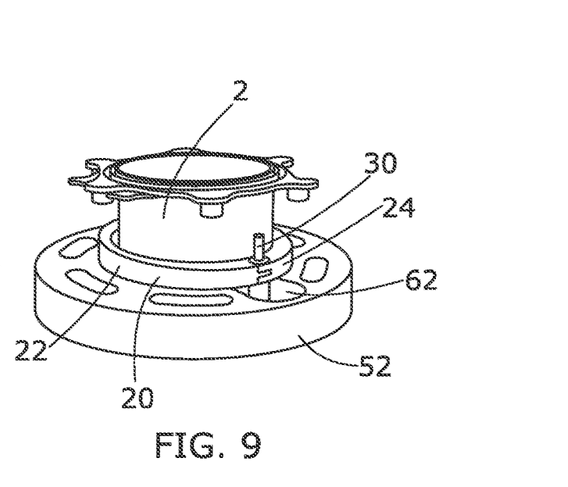
FIG. 9 is a perspective view in which the male tubular part has penetrated into the band held by the base.

As will be seen later, the coupling between the tubular parts can be done directly or in two stages. In the case of a coupling in two stages, and as illustrated in FIGS. 7 through 9, the tool 18 comprises a base 52 independent of the band 20 that has a form making it possible to hold the band in a position allowing the coupling with the male tubular part 2. In a first stage, the coupling method comprises an additional phase of preliminary preparation. This phase comprises a step of installation of the band on the base 52 so that the central axis of the base coincides with the axis X-X of the band. In this step, the male part 2 is then inserted into the band 20 held in position by the base 52. Upon the introduction of the male part, the male part is threaded around a portion of the base as will be seen later, allowing the axis of the male part to coincide with the central axis of the base and the axis X-X of the band in order to guarantee a linear translation of the male part 2 along the axis X-X to condition the seal in its operating compression. In a second phase, the male part 2 engaged with the tool 18 is joined with the female tubular part 4. The base 52 is provided with specific elements in order to facilitate the placing of the band 20 on the male tubular part 2.

Thus, as shown in FIGS. 7 through 11, the base 52 has a base planar face 54 making it possible to rest on any planar surface 56. The base 52 comprises at least one cavity 58 making it possible to receive at least one appendage 60 of the band 20 of a form corresponding to the cavity 58 and to hold the band 20 in a position allowing the insertion of the male tubular part 2. When the appendage or appendages 60 of the band 20 are inserted into the cavities 58 of the base, the axis X-X of the compression ring 38 is at right angles to the plane of the planar surface 56 on which the base 52 rests. Thus, the male tubular part 2 is inserted into the band 20 such that the central axis X-X of the tubular part is at right angles to the surface 56 on which the base 52 rests. The appendage or appendages 60 thus make it possible to offer both the polarizing function, with the operator not being able to mistake the direction of use, and the function of holding the band in position for the installation of the male tubular part. Excavations 62 are provided in the base 52 to allow the passage of elements of any type situated protruding on the band 20 and/or the male tubular part 2 such as, for example, the pins 30 of the band 20 and/or to lighten it.

Hereinafter in the description, it is considered that the surface 56 on which the base 52 rests is horizontal and that any right-angled direction is vertical.

The base 52 comprises, at its center and protruding outwards and upwards (namely from the face opposite the base face 54), a portion 64 of tubular duct of the same form as the male tubular part 2 and of slightly smaller diameter so as to allow the part 2 to be threaded around the portion 64 which guides the displacement. To engage the male tubular part in the band, the male tubular part 2 is placed around the portion 64 of duct.

An abutment 66 is provided so as to stop the displacement of the male tubular part 2 when the band 20 is in position, namely when the compression ring 38 is positioned at the groove 8.

Figures 12, 13:
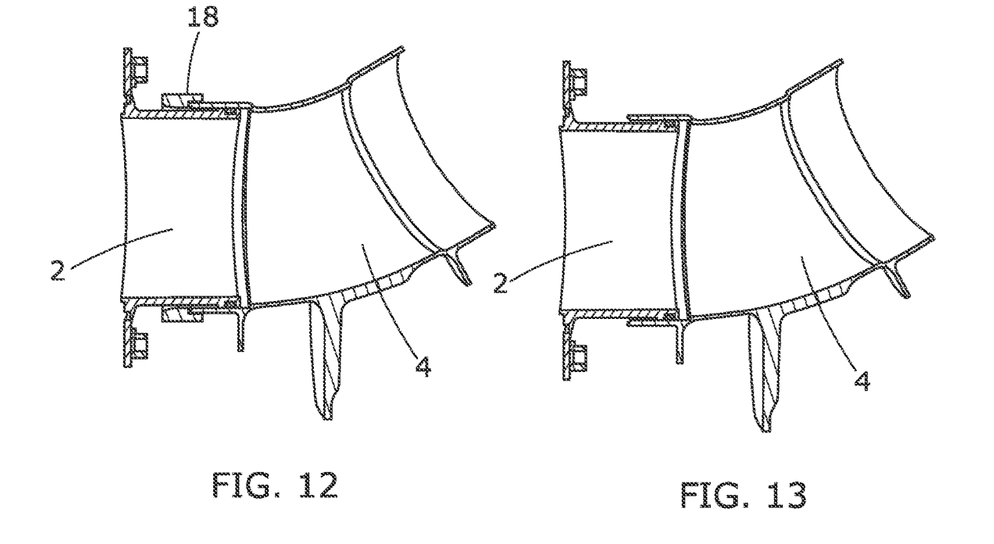
FIGS. 12 and 13 are partial cross-sectional views of the tubular parts fitted into one another, the band being still in place on one and removed from the other.

FIGS. 12 and 13 represent the second coupling step which will be described later.

Figure 15:
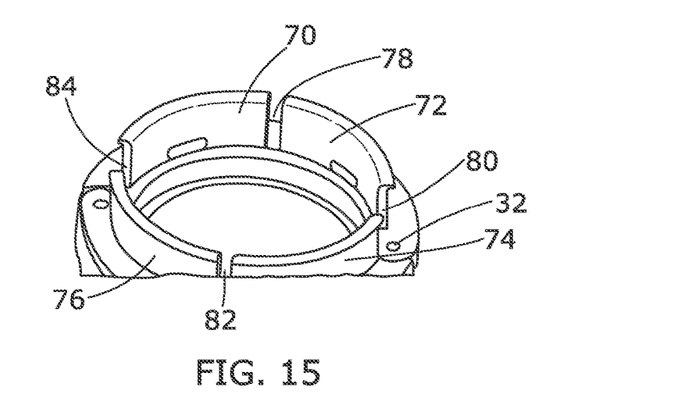
FIG. 15 is a partial enlarged view of the band represented in FIG. 14.
Figure 16:
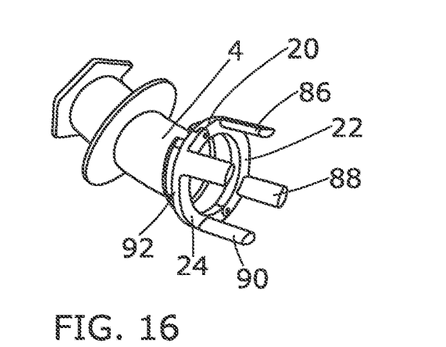
FIGS. 16 through 19 are perspective views of different steps of direct joining of one tubular part to another by using the band represented in FIGS. 14 and 15.
Figure 17:
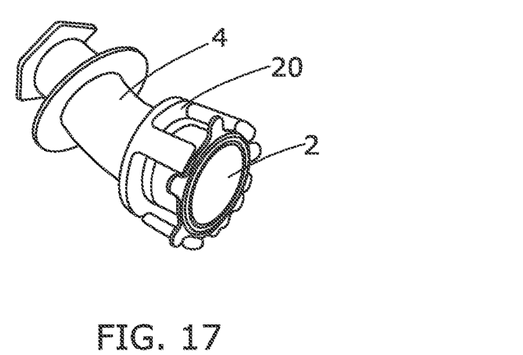
Figure 18:
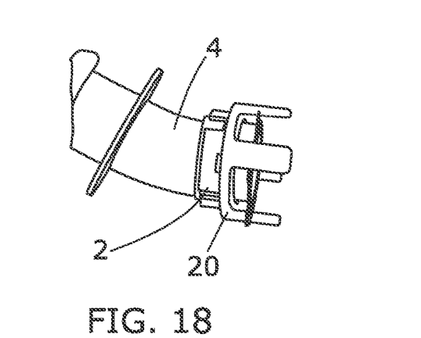
Figure 19:
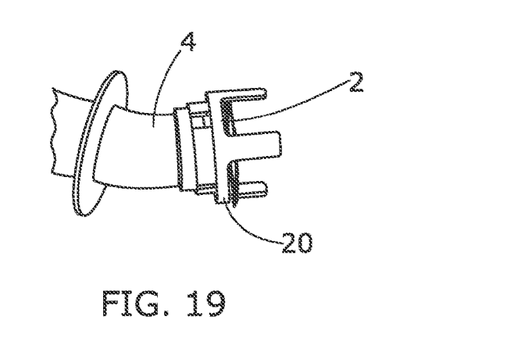

In the case of a direct join between the tubular parts represented in FIGS. 14 through 19 without involving an intermediate part such as the base 52, the band 20 has a skirt 68 intended to be attached around the outer surface of the female tubular part to position and assist in the holding of the band 20. The skirt 68 can be continuous over all the periphery of the band or, as represented in FIGS. 14 and 15, in several parts 70, 72, 74 and 76 separated by spaces 78, 80, 82, 84. The band 20 also has at least two guiding tabs 86, 88, 90, 92, distributed at regular intervals at the periphery of the band 20. In the embodiment illustrated, the band 20 comprises four guiding tabs 86, 88, 90, 92. The tabs 86, 88, 90, 92 ensure a polarizing function allowing the operator manipulating the tool not to mistake the side during the manipulation. The tabs 86, 88, 90, 92 also make it possible to guide the displacement of the male tubular part 2 when it is inserted into the band 20. In the embodiment illustrated, the tabs 86, 88, 90, 92 have an overall parallelepipedal form of curved rectangular section in order to obtain a centering.

As seen above, the joining is done blind and is very often performed in environments without easy access. To make it possible to check that the joining is done correctly, the band, at least at the cylindrical 34 and tapered 36 faces, is made of transparent material. It is thus possible for the operator to check the correct behaviour of the seal during the joining.

The method for installing the seal when joining one tubular part to another is described hereinbelow. The installation method described first is that performed in two steps by using an intermediate part such as the base 52 then, secondly, without intermediate part when joining tubular parts directly to one another.

Whether it be in one or other of the alternatives presented, the method for installing the seal comprises the following two steps performed in succession:

compression of the seal 6 installed on the male tubular part 2 using the compression ring 38 of the tool which encircles the male part at least at the groove 8 and which exerts a compression on the seal;

insertion of the male part 2 into the female part 4 using the tool 18, the outwardly protruding tongue 44 of which is positioned at the inner surface of the female tubular part, the tongue 44 being placed in contact with the chamfered surface 14 of the female part.

In the case of an installation in two phases illustrated in FIGS. 3, 7 through 13, in a first phase of preliminary preparation, the band 20 is positioned closed on the base 8. The band 20 is placed on the base 52. The appendage or appendages 60 of the band are fitted into the corresponding cavities 58 of the base 52. The operator thus ensures that the band is placed in the right direction.

Once the band is held in position on the base 52, the male end-fitting 2 is placed around the tubular duct portion 64 of the tool 18. The operator then only has to push it gently downwards. This operation could be performed automatically using a suitable piston. The slight slope offered by the tapered face 36 of the band makes it possible to progressively compress the seal 6 to the desired dimension when the groove 8 arrives at the compression ring 38. The displacement of the male end-fitting 2 is stopped and blocked by the abutment 66.

In a second phase, as represented in FIGS. 12 and 13, the male end-fitting 2 on which the seal 6 is held compressed by the band 20 is joined with the female tube 4 by fitting. The band 20 is in position on the male tubular part. The male tubular part provided with the band is positioned at the female tubular part so that the tongue comes into contact with the chamfered surface. The operator pushes the male end-fitting into the female tube, whether it is straight or bent as shown in FIGS. 12 and 13. The groove 8 of the male end-fitting in which the seal 6 is situated slides over the inner surface of the band 20 then over the inner surface of the female tube without encountering any discontinuity, the surfaces being at the same level by virtue of the tongue 44. The seal 6 is pre-compressed by the band 20 and the tongue allows the seal to remain pre-compressed to the point of full penetration into the female tubular part, namely beyond the chamfered surface, namely beyond the changes of form of the inner surface of the female part. When the male end-fitting is joined inside the female tube, the groove 8 is placed entirely inside the female tube and the band 20 can be removed using the closing/opening device 26, i.e., here, by removing a pin 30.

FIGS. 14 through 19 illustrate the method for inserting the seal directly when joining one tubular part to another. The band 20 in this case comprises tabs 86, 88, 90, 92 making it possible both to immediately register the direction of use and to guide the male end-fitting inside the female tube.

The skirt 68 of the band makes it possible to position it around the female tube 4. The male end-fitting 2 is then placed in the band retained and guided by the guiding tabs 86, 88, 90, 92. When the end-fitting 2 is displaced along the tapered face 36, the seal is progressively compressed. The male tubular part continues its travel, pushed by the operator inside the female tubular part. The gentle slope offered by the tapered face of the band makes it possible to progressively compress the seal to the desired dimension when the groove of the male tubular part arrives level with the compression ring of the band 20. The groove of the male end-fitting in which the seal is situated slides over the inner surface of the band and more specifically over the tapered face 36 then the cylindrical face 34 then over the chamfered inner surface of the female tubular part without discontinuity, the surfaces being flush by virtue of the form of the tongue complementing the form of the end chamfered surface of the female tubular part. When the male end-fitting is joined inside the female tubular part, the groove is placed entirely inside the female tubular part beyond the chamfered surface and the band can be removed using the closing/opening device, i.e., here, by removing the pin 30.

In the course of the joining operation, it is possible for the operator to check the condition of the seal by virtue of the transparent material used for the band. The tool can be designed or be adapted to any type of part diameter.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tool for installing an annular seal to ensure seal-tightness between two tubular parts, one male and one female, the male part comprising a groove into which a seal can be inserted and an end of the female part being chamfered, the tool comprising: a clamping band having a cylindrical inner face of planar surface forming a compression ring configured to encircle the male part at least at the groove to exert a compression on the seal and eliminate any protrusion or relief of the seal upon insertion in the female part; one end of two ends of the clamping band being a female end configured to contact the female part and the other end of the two ends of the clamping band being a male end; the female end of the clamping band having a tongue protruding outwards of which one face forms part of the cylindrical inner face of the clamping band, the tongue having a form allowing the tongue to contact the chamfered surface of the female part.

2. The tool according to claim 1, wherein the tongue has a form such that an end of the tongue is flush with an inner surface of the female part beyond the chamfered surface when the tool is installed on the female part and the tongue is in contact with the chamfered surface of the female part.

3. The tool according to claim 1, wherein an inner diameter of an end of the tongue is identical to an inner diameter of the female part.

4. The tool according to claim 1, wherein the tongue has a right-angled prism form of which a planar lateral face opposite a right angle of the right-angled prism is configured to contact the chamfered surface.

5. The tool according to claim 4, wherein the clamping band has a tapered inner face, a radius of which decreases from the male end to the cylindrical inner face.

6. The tool according to claim 5, comprising a base independent of the clamping band having a form configured to hold the clamping band in a position allowing coupling with the male part, the form comprising a cavity configured to receive one appendage of the clamping band corresponding to the cavity, and a base planar surface allowing it to rest on a surface such that an axis X-X of the compression ring is at right angles to a plane of the surface.

7. The tool according to claim 6, wherein the base has a cavity that is in a form complementing an appendage provided on the female end of the clamping band to hold the clamping band in position on the base.

8. The tool according to claim 1, wherein at least two guiding tabs are distributed at a periphery of the clamping band.

9. The tool according to claim 1, wherein at least the cylindrical inner face and a tapered inner face of the clamping band are made of transparent material.

10. The tool according to claim 1, wherein the clamping band comprises at least two mutually articulated portions linked by a closing/opening mechanism.

11. A method for installing an annular seal to ensure seal-tightness between two tubular parts, one male and one female, the male part comprising a groove into which a seal is insertable and an end of the female part being chamfered, the method comprising: compressing the seal installed on the male part using a tool comprising a clamping band having a cylindrical inner face of planar surface forming a compression ring configured to encircle the male part at least at the groove to exert a compression on the seal and eliminate any protrusion or relief of the seal upon insertion in the female part, one of the two ends of the clamping band being a female end configured to contact the female part and another of the two ends of the clamping band being a male end; and inserting the male part into the female part using the clamping band, the female end of which has a tongue protruding outwards of which one of the faces forms part of the cylindrical inner face of the clamping band, the tongue being placed in contact with the chamfered surface of the female part.

12. The method according to claim 11, comprising a preliminary preparation step comprising positioning the band closed on a base before compression of the seal obtained by introduction of the male part into the band.

* * * * *